United States Patent [19]

Martin

[11] 3,856,541

[45] Dec. 24, 1974

[54] HYDRAULIC CEMENT AND METHOD OF CEMENTING IN ENVIRONMENTS HAVING ELEVATED TEMPERATURES

[75] Inventor: Robert C. Martin, Tulsa, Okla.

[73] Assignee: The Dow Chemical Company, Midland, Mich.

[22] Filed: Sept. 8, 1972

[21] Appl. No.: 287,458

Related U.S. Application Data

[63] Continuation-in-part of Ser. No. 138,339, April 28, 1971, abandoned, which is a continuation-in-part of Ser. No. 106,560, Jan. 14, 1971, abandoned.

[52] U.S. Cl.................. 106/90, 106/315, 166/294
[51] Int. Cl............................................. C04b 7/02
[58] Field of Search...... 106/90, 314, 315; 166/293, 166/294

[56] References Cited
UNITED STATES PATENTS

| | | | |
|---|---|---|---|
| 1,510,795 | 10/1924 | Newberry | 106/89 |
| 1,852,595 | 4/1932 | Steinour | 106/89 |
| 2,211,368 | 8/1940 | Dickens | 106/315 |
| 2,705,050 | 3/1955 | Davis et al. | 106/90 |
| 3,053,674 | 9/1962 | Liberthson et al. | 106/315 |
| 3,100,526 | 8/1963 | Martin | 106/315 |
| 3,234,154 | 2/1966 | Martin | 106/90 |
| 3,433,657 | 3/1969 | Pickering | 106/90 |
| 3,748,159 | 7/1973 | George | 106/90 |

OTHER PUBLICATIONS

Concrete Tech & Practice, W. H. Taylor, 1965, American Elsevier Pub. Co., p. 185.

*Primary Examiner*—Delbert E. Gantz
*Assistant Examiner*—James W. Hellwege
*Attorney, Agent, or Firm*—Bruce M. Kanuch; William M. Yates

[57] ABSTRACT

A mixture of component (1) water-soluble hydroxy-carboxylic acid or salt thereof and component (2) boric acid or a water-soluble salt thereof when admixed with an aqueous hydraulic cement slurry increases the normal setting time of the cement slurry. A water-soluble boron containing hydroxy carboxylic acid or salt thereof can be substituted for the above defined mixture.

6 Claims, No Drawings

Other ingredients which may be present in the slurry include well-known additaments employed in the art, e.g. fluid-loss control agents, of which certain cellulose derivatives, polystyrene sulfonate or polyvinyltoluene sulfonate are illustrative; friction-loss control agents, e.g. as described in U.S. Pat. No. 3,254,719 and stabilizers such as an amine derivative of refined lignin, e.g. as taught, for example, in U.S. Pat. No. 3,234,154 and other known materials.

The ratio of dry hydraulic cement to water is that commonly employed in the known art and may be, for example, between about 30 and about 65 parts by weight (preferably 35 to 50 parts) of water per hundred parts dry weight of cement.

The improved cement is emplaced in a location desired to be cemented, e.g. a geologic formation or wellbore, by employing conventional mixing and pumping equipment and piping layouts. Truck-mounted mixers provided with high velocity pumps are commonly employed.

herein represented. Other cements can be used in the practice of the invention.

EXAMPLE 1

In this series of tests the setting rate of the Class H Cement containing only borax [as component (2)] or sodium gluocoheptonate [as component (1)] and various mixtures thereof was determined. Silica flour was used, as is customary in high temperature well cementing, to impart additional strength to the set cement.

The ingredients shown in Table I below were admixed in the amounts shown and tested in accordance with API Casing Cementing Section 10, Schedule 11, Simulated 20,000 feet and 340° F Circulation Temperature.

The thickening times (API) of the Class H Cement (containing 35% of finely divided silica flour, of about 100 to 190 mesh) and containing various amounts of borax, a sodium glucoheptonate or both are set forth in Table I.

TABLE I

| Total Retardant Percent Based on 100 Parts Dry Cement | | Wt. Ratio Retardant Borax:(1) | % By Wt. Borax (Dry Cement) | % By Wt. (1) (Dry Cement) | API Thickening Time Pan Am. Consistometer Hours:Minutes |
|---|---|---|---|---|---|
|  | None | — | — | — | 0:52 |
| 0.5 | Borax | — | 0.5 | — | 1:38 |
| 1.0 | Borax | — | 1.0 | — | 1:01 |
| 3.0 | Borax | — | 3.0 | — | 1:29 |
| 5.0 | Borax | — | 5.0 | — | 1:29 |
| 0.5 | Sodium Glucoheptonate | — | — | 0.5 | 0:56 |
| 1.0 | do. | — | — | 1.0 | 2:33 |
| 1.5 | do. | — | — | 1.5 | 4:32 |
| 2.0 | do. | — | — | 2.0 | >6:00 |
| 3.0 | do. | — | — | 3.0 | >6:00 |
| 1.0 | do. | 1:5 | ~ .20 | ~ .80 | 2:30 |
| 1.0 | do. | 1:3 | .25 | .75 | 2:04 |
| 1.0 | do. | 1:1 | .50 | .5 | 1:47 |
| 1.0 | do. | 3:1 | .75 | .25 | 1:15 |
| 1.0 | do. | 5:1 | ~ .8 | ~ .2 | 0:52 |
| 1.5 | do. | 1:5 | .25 | 1.25 | 4:51 |
| 1.5 | do. | 1:4 | .30 | 1.20 | 5:28 |
| 1.5 | do. | 1:3 | .37 | 1.13 | 6:12 |
| 1.5 | do. | 1:2 | .50 | 1.00 | >6:00 |
| 1.5 | do. | 1:1 | .75 | .75 | >6:00 |
| 1.5 | do. | 2:1 | 1.00 | .50 | >6:00 |
| 1.5 | do. | 3:1 | 1.13 | .37 | 3:31 |
| 1.5 | do. | 4:1 | 1.20 | .30 | 2:10 |
| 1.5 | do. | 5:1 | 1.25 | .25 | 3:45 |
| 1.5 | do. | 6:1 | 1.29 | .21 | 2:15 |
| 2.0 | do. | 1:5 | .33 | 1.67 | 5:56 |
| 2.0 | do. | 1:3 | .50 | 1.50 | >6:00 |
| 2.0 | do. | 1:1 | 1.00 | 1.00 | >6:00 |
| 2.0 | do. | 3:1 | 1.50 | .50 | >6:00 |
| 2.0 | do. | 4:1 | 1.60 | .40 | >6:00 |
| 2.0 | do. | 5:1 | 1.67 | .33 | 3:25 |
| 3.0 | do. | 1:5 | .50 | 2.50 | >6:00 |
| 3.0 | do. | 1:3 | .75 | 2.25 | >6:00 |
| 3.0 | do. | 1:1 | 1.50 | 1.50 | >6:00 |
| 3.0 | do. | 3:1 | 2.25 | .75 | >6:00 |
| 3.0 | do. | 5:1 | 2.50 | .25 | >6:00 |

COMPARATIVE TESTS AND EXAMPLES OF THE INVENTION

The following basic recipe was employed in the following Examples:

100 Parts by dry weight of Class H Cement (as described in API RP 10B) 30 to 60 parts of water, and an amount of component (1) sodium gluocoheptonate and/or component (2) borax, as shown in the following tables. The borax, when used, was a technical grade of $Na_2B_4O_7 \cdot 10H_2O$. Class H Cement is a high temperature cement and was used herein because it best represents practical operating or field usage under the conditions The data obtained in this Example clearly demonstrates the synergism of a combination of a boric acid or salt thereof and a water-soluble hydroxycarboxylic acid.

In this series of tests Class H Cement (containing 35% by weight of finely divided silica flour) was again used but the testing was conducted at different schedules (taken from API RP 10B Section 10) as shown in Table II which follows.

The thickening times (API) of the Class H Cement containing various amounts of borax and sodium glucoheptonate are shown in Table II.

HYDRAULIC CEMENT AND METHOD OF CEMENTING IN ENVIRONMENTS HAVING ELEVATED TEMPERATES

CROSS REFERENCE TO RELATED APPLICATION

This is a continuation-in-part of patent application Ser. No. 138,339, filed Apr. 28, 1971, now abandoned which in turn was a continuation-in-part of patent application Ser. No. 106,560, filed Jan. 14, 1971, now abandoned, by Robert C. Martin.

BACKGROUND OF THE INVENTION

Aqueous hydraulic cement slurries are frequently used for construction of buildings, surfacing (e.g. roads, parking lots, etc.) and in underground cementing operations, e.g. in geologic formations penetrated by a wellbore (usually employed therein for purposes for securing a casing in place or for water or brine shut-off), and in tunnels, dams, or reservoir constructions. In many instances the ambient temperature in the cementing environment is sufficiently high to accelerate the normal rate of setting of the cement. In some instances the cement sets up so fast that there is not sufficient time for the preparation of the slurry and its proper emplacement in the location where it is to setup.

Various additaments have been added to cement slurries to retard the rate of set thereof.

However, the problem of controlling the setting rate of cement slurries when employed at high temperatures without impairment of the ultimate strength values of the cement has not been fully solved. This problem is especially acute in oil well cementing jobs performed at ever increasing depths wherein the bottom hole temperature is often so high that conventional cement slurries cannot be employed because they set up in the tubing and annulus before the cementing job can be completed.

Conventional cement slurry compositions comprise, for example, (1) a hydraulic cement, e.g. Portland, aluminous, pozzolanic, or expansive cements or mixtures thereof (sometimes they also contain gypsum or the like); (2) water; and (3) as desired, additional functional control agents to alter or control certain properties of the cement such as the rate of setting (usually a function of thickening rate), fluid-loss to a porous material (e.g., a loosely consolidated geologic formation) in contact therewith during the setting period, and friction-reducing agents effective during movement through tubes, pipes, casings, and the like.

SUMMARY OF THE INVENTION

The present invention comprises an improved aqueous hydraulic cement slurry and method of cementing in environments wherein the normal setting rate of the cement slurry should be retarded. The slurry contains as a required additament, an improved retardant to the rate of setting thereof. The retardant does not have an adverse effect on the ultimate compressive strength of the slurry. The additament is a heretofore unknown combination which is much more effective at the usual troublesome higher temperatures than would be expected from the behavior of each of the components of the combination when used separately. The retardant comprises (1) at least one water-soluble hydroxycarboxylic acid or metal salt thereof and (2) at least one of boric acid or a water-soluble salt thereof, e.g. a borate, for example, borax. This combination when added to a cement slurry in an effective amount results in a truly synergistic effect in retarding the setting rate thereof. In place of the above mixture a water soluble boron containing hydroxycarboxylic acid or alkali or alkaline earth metal salt thereof can be employed.

The novel retarded cement can be employed at temperatures as high as between about 200° F and 400° F. Most commonly temperatures between 230° F and about 230° F will be encountered; however, the retardant is effective at higher temperatures if the time existing between mixing and emplacement is not unduly short.

An effective amount of the retardant is employed to retard the setting rate of a cement slurry sufficiently to allow its proper emplacement. The amount of the retardant, based on 100 parts by weight of dry hydraulic cement present can range from between about 0.5 and about 5.0 parts by weight of component (1) and between about 0.5 and about 5.0 parts by weight of component (2) to make a total of both (1) and (2) of between about 1.0 and 10.0 parts based on the 100 parts dry weight of cement present. Preferably between about 1 and 4.0 parts of each of (1) and (2) are employed. From about 0.1 to 10 parts, preferably 0.1 to about 5.0 parts by weight per 100 parts by weight of dry cement of the water soluble boron hydroxycarboxylic acid or alkali or alkaline earth metal salt thereof is employed.

Component (2) comprises at least one of boric acid or a water-soluble salt of boric acid. Of the latter natural minerals such as borax, kernite and ulexite are suitable. Other suitable water-soluble salts include, for example, alkali and alkaline earth metal salts, e.g. $LiBO_2 \cdot 8H_2O$; $NaBO_2 \cdot 4H_2O$; $Li_2B_4O_7 \cdot H_2O$; $Na_2B_4O_7 \cdot 10H_2O$; $LiB_5O_8 \cdot 5H_2O$; $NaB_5O_8 \cdot 5H_2O$; $KB_5O_8 \cdot 4H_2O$ and the like.

Component (1), the water-soluble hydroxycarboxylic acid or salt thereof, is any saturated or unsaturated hydroxycarboxylic acid or salt thereof (e.g. alkali or alkaline earth metal salt) containing one or more hydroxy groups and one or more carboxylic groups and which is sufficiently soluble in water to be effective as a retarder in the cement slurry. Included by way of example are low molecular weight aliphatic materials such as, for example, tartaric acid, gluconic acid, citric acid or salt thereof and higher molecular weight materials such as carboxymethylcellulose glucoheptonic acid or salt thereof and the like. The use of glucoheptonic acid or its salt as an additive for retarding the setting of cements is disclosed in U.S. Pat. No. 3,234,154.

The boron containing hydroxycarboxylic acid or salt thereof is the product formed by reacting a water soluble hydroxycarboxylic acid or salt thereof with, for example, boric acid. It is theorized that this reaction takes place in situ in the cement slurry when components (1) and (2) are added thereto. Tests of preformed boron containing hydroxycarboxylic acid or salt thereof as a retarder tend to support this theory since such boron salts also are found to synergistically retard the set of cement slurries, especially under elevated temperatures. Suitable boron containing compounds include, for example, those formed by the reaction of a hydroxycarboxylic acid or salt thereof and boric acid. Included by way of example are sodium borogluconate, calcium borogluconate, sodium borotartate, and the like.

TABLE II

| Percent Retardant Based on 100 Parts Cement by Dry Weight | Retardant Wt. Ratio Borax (1) | *API Thickening Time Hours and Minutes, API Schedule | | | |
|---|---|---|---|---|---|
| | | 7 | 8 | 9 | 10 |
| | | 172°F 12,000 ft. | 206°F 14,000 ft. | 248°F 16,000 ft. | 300°F 18,000 ft. |
| 0.1 | 3:1 | 1:40 | — | — | — |
| 0.2 | 3:1 | 3:34 | — | — | — |
| 0.3 | 3:1 | 4:54 | 3:46 | — | — |
| 0.1 | 1:3 | >1:40 | — | — | — |
| 0.2 | 1:3 | >4:00 | >4:00 | 2:22 | — |
| 0.3 | 1:3 | >4:00 | >4:00 | 3:32 | — |
| 0.4 | 3:1 | >4:00 | >4:00 | 1:36 | — |
| 0.4 | 1:3 | >4:00 | >4:00 | >6:00 | — |
| 0.6 | 3:1 | >4:00 | >4:00 | 2:03 | — |
| 0.8 | 3:1 | >4:00 | >4:00 | 2:49 | — |
| 0.9 | 3:1 | >4:00 | >4:00 | 2:26 | — |
| 1.0 | 3:1 | >4:00 | >4:00 | 5:47 | 1:23 |
| 1.0 | 1:3 | >4:00 | >4:00 | >6:00 | 6:03 |
| 1.4 | 3:1 | >4:00 | >4:00 | >6:00 | 1:43 |
| 1.6 | 3:1 | >4:00 | >4:00 | >6:00 | >7:00 |

*Those tests wherein the slurry did not set within the time shown, subsequently set when the temperature was higher as shown in Table III, infra.

It can be seen by examination of Table II that any ratio of from 3 to 1 borax to 1 to 3 of sodium glucoheptonate gave desirable setting rates under the conditions of the four schedules tested and that the length of time of the setting was greatly increased by increasing the total parts of the retardant to the dry cement weight.

EXAMPLE 2

Class H Cement (as described in Example 1) was again employed in this series of tests. This series was conducted over a period of 24 hours at 3,000 p.s.i. autoclave pressure in accordance with the API Schedules shown in Table III to show the effect of the presence of the retardant according to the invention, on compressive strength values of the set cement.

TABLE III

| Percent Total Retardant Based on Cement Weight | Retardant Wt. Ratio Borax:(1) | Compressive Strength (p.s.i.) | | | | |
|---|---|---|---|---|---|---|
| | | 7 | 8 | 9 | 10 | 11 |
| | | 260°F 12,000 ft. | 290°F 14,000 ft. | 320°F 16,000 ft. | 350°F 18,000 ft. | 380°F 20,000 ft. |
| None | — | 5300 | — | — | — | — |
| 0.1 | 3:1 | 6000 | — | — | — | — |
| 0.2 | 3:1 | 6200 | — | — | — | — |
| 0.3 | 3:1 | 6100 | — | — | — | — |
| 0.1 | 1:3 | 5250 | — | — | — | — |
| 0.2 | 1:3 | 7470 | — | — | — | — |
| None | — | — | 2500 | — | — | — |
| 0.3 | 3:1 | — | 2650 | — | — | — |
| 0.4 | 3:1 | — | 2625 | — | — | — |
| 0.5 | 3:1 | — | 2500 | — | — | — |
| 0.1 | 1:3 | — | 2450 | — | — | — |
| 0.2 | 1:3 | — | 2550 | — | — | — |
| 0.3 | 1:3 | — | 3030 | — | — | — |
| None | — | — | — | 2378 | — | — |
| 0.8 | 3:1 | — | — | 1362 | — | — |
| 1.0 | 3:1 | — | — | 1599 | — | — |
| 0.3 | 1:3 | — | — | 1087 | — | — |
| 0.4 | 1:3 | — | — | 1341 | — | — |
| 0.6 | 1:3 | — | — | 1157 | — | — |
| None | — | — | — | — | 2528 | — |
| 1.4 | 3:1 | — | — | — | 1161 | — |
| 1.6 | 3:1 | — | — | — | 903 | — |
| 1.8 | 3:1 | — | — | — | 1419 | — |
| 1.0 | 1:3 | — | — | — | 3670 | — |
| 1.2 | 1:3 | — | — | — | 2061 | — |
| 1.4 | 1:3 | — | — | — | 1715 | — |
| None | — | — | — | — | — | 10,200 |
| 1.6 | 3:1 | — | — | — | — | 13,800 |
| 1.8 | 3:1 | — | — | — | — | 13,000 |
| 2.0 | 3:1 | — | — | — | — | 12,000 |
| 2.4 | 3:1 | — | — | — | — | 10,290 |
| 1.2 | 1:3 | — | — | — | — | 10,900 |
| 1.4 | 1:3 | — | — | — | — | 12,500 |
| 1.6 | 1:3 | — | — | — | — | 8,700 |

Reference to Table III shows that, at the various schedules employed, the same ratios of components employed in Example 1 above, there is a definite improvement in compressive strength of the set cement as the total amount of retardant was increased in the slurry.

EXAMPLE 3

Thickening time tests were conducted on a Class H cement obtained from Oklahoma Cement Company. A cement slurry was formed containing 800 grams cement, 280 grams silica flour, and 448 grams water. To various samples of the cement slurry were added various amounts of sodium boroglucoheptonate or a mixture of 3 parts by weight of borax and 1 part sodium glucoheptonate and 1 part silica flour. The thickening time of the various mixes was determined by API schedules 9, 10 and 11. The results of the tests are set forth in the following Table IV.

The compressive strength of samples of the same cement slurry containing various amounts of sodium boroglucoheptonate were also determined. The results of these tests are set forth in the following Table V.

TABLE V

| Test No. | Retarder | Percent Retarder Based on Weight of Dry Cement | Compressive Strength, psi API Schedule | | |
|---|---|---|---|---|---|
| | | | 9S 320°F | 10S 350°F | 11S 380°F |
| 1 | Sodium Boroglucoheptonate | None | 4812 | 3171 | 5147 |
| 2 | do. | 0.3 | 1728 | — | — |
| 3 | do. | 0.4 | 1613 | — | — |
| 4 | do. | 1.3 | — | 1462 | — |
| 5 | do. | 1.4 | — | 1186 | — |
| 6 | do. | 1.1 | — | — | 6332 |
| 7 | do. | 1.2 | — | — | 6205 |

EXAMPLE 4

Several compounds or mixtures of various compounds were tested to determine their effect on the thickening time of Class H cement slurry containing 800 grams of Class H cement, 280 grams silica flour and 448 grams of $H_2O$. The tests were run according to API PB 10 B Schedule 11. The results of these tests are set forth in the following Table VI.

TABLE IV

| Test No. | Retarder | Percent Retarder Based On Weight of Dry Cement | 9 248°F 16,000 ft. | 10 300°F 18,000 ft. | 11 340°F 20,000 ft. |
|---|---|---|---|---|---|
| 1 | Sodium Boroglucoheptonate | 0.3 | 2:00 | — | — |
| 2 | do. | 0.4 | +8:00 | — | — |
| 3 | do. | 0.9 | +8:00 | 2:11 | 2:54 |
| 4 | do. | 1.0 | +8:00 | 3:06 | 3:13 |
| 5 | do. | 1.1 | +8:00 | 4:39 | 5:20 |
| 6 | do. | 1.2 | +8:00 | 2:30 | +8:00 |
| 7 | do. | 1.3 | +8:00 | 5:24 | +8:00 |
| 8 | do. | 1.4 | +8:00 | +8:00 | +8:00 |
| 9 | 3 Parts Borax, 1 Part Sodium Glucoheptonate, 1 Part Silica Flour | 1.3 | — | — | 2:42 |
| 10 | do. | 1.5 | — | — | 5:20 |
| 11 | do | 1.7 | — | — | +8:00 |
| 12 | do. | 1.9 | — | — | +8:00 |

TABLE VI

| Test No. | Retarder Parts by Weight of Each | Percent Retarder Based on Weight Of Dry Cement | Thickening Time Hrs:Mins |
|---|---|---|---|
| 1 | $3K_2B_4O_7$:1 SGH* | 1.5 | +10:00 |
| 2 | 3 Borax: 1 SGH* | 1.0 | 2:48 |
| 3 | $3K_2B_4O_7$:1 SGH* | 1.0 | + 6:00 |
| 4 | 3.6 Borax:1 SGH* | 1.15 | + 6:00 |
| 5 | Quebracho Tree Bark Extract | 2.0 | 3:20 |
| 6 | Hemlock Tree Bark Extract | 3.00 | 2:10 |
| 7 | 3 Borax 1 Quebracho Bark Extract | 3.00 | + 6:00 |
| 8 | 3 Borax 1 Quebracho Bark Extract | 2.00 | + 5:00 |
| 9 | $3LiB_4O_7$:1 SGH* | 1.00 | + 5:00 |
| 10 | 3 Borax:1 Tartaric Acid | 1.5 | + 6:00 |
| 11 | 5 Borax:1 Tartaric Acid | 1.5 | 1:49 |
| 12 | Borax:5 Tartaric Acid | 1.5 | 5:51 |
| 13 | 1 Borax:3 Tartaric Acid | 1.5 | + 8:00 |
| 14 | 3 Borax:1 Delta-Gluconolactone | 1.5 | + 6:00 |
| 15 | 3 Borax:1 Delta-Gluconolactone | 1 | 4:16 |

*SGH is sodium glucoheptonate

What is claimed is:

1. In the method of emplacing an aqueous hydraulic cement slurry into an environment having an elevated temperature of at least about 200° F which temperature would normally cause a premature setting of the hydraulic cement, the improvement which comprises:
admixing with said hydraulic cement slurry a water soluble alkali or alkaline earth metal salt of a boron containing hydroxycarboxylic acid in an amount ranging from about 0.1 to about 10 parts by weight per 100 parts by weight of dry cement to retard the setting rate of said hydraulic cement slurry at said elevated temperature.

2. The method of claim 1 wherein the salt of the water soluble boron containing hydroxycarboxylic acid is an alkali metal salt.

3. The method of claim 1 wherein the salt of the water soluble boron containing hydroxycarboxylic acid is an alkaline earth metal salt.

4. A hydraulic cement composition comprising:
a. a hydraulic cement slurry, and
b. about 0.1 to about 10 parts by weight of an alkali or alkaline earth metal salt of a boron containing hydroxycarboxylic acid per 100 parts by weight of dry cement to retard the setting rate of the hydraulic cement slurry when emplaced in an environment having an elevated temperature of at least about 200° F.

5. The composition of claim 4 wherein the salt of the water soluble boron containing hydroxycarboxylic acid is an alkali metal salt.

6. The composition of claim 4 wherein the salt of the water soluble boron containing hydroxycarboxylic acid is an alkaline earth metal salt.

* * * * *

UNITED STATES PATENT OFFICE
CERTIFICATE OF CORRECTION

Patent No. 3,856,541  Dated December 24, 1974

Inventor(s) Robert C. Martin

It is certified that error appears in the above-identified patent and that said Letters Patent are hereby corrected as shown below:

Column 2, line 9, delete "230°" and insert --340°--.

Column 5, Table II, column 1, line 1, delete "Percent Retardant" and insert --Total Retardant Percent--.

Column 8, Table VI, column 2, item 12, delete "Borax:5 Tartaric Acid" and insert --1 Borax:5 Tartaric Acid--.

Signed and sealed this 22nd day of April 1975.

(SEAL)
Attest:

RUTH C. MASON
Attesting Officer

C. MARSHALL DANN
Commissioner of Patents
and Trademarks